United States Patent [19]

Reeves, Jr.

[11] Patent Number: 4,630,960
[45] Date of Patent: * Dec. 23, 1986

[54] ADJUSTABLE HERRINGBONE LOCK JOINT

[76] Inventor: James B. Reeves, Jr., 1315 Whitman Dr., Glen Burnie, Md. 21061

[*] Notice: The portion of the term of this patent subsequent to Feb. 18, 2003 has been disclaimed.

[21] Appl. No.: 686,826

[22] Filed: Dec. 27, 1984

Related U.S. Application Data

[63] Continuation-in-part of Ser. No. 512,540, Jul. 11, 1983, Pat. No. 4,531,926, Ser. No. 611,111, May 17, 1984, Pat. No. 4,559,028, and Ser. No. 647,437, Sep. 5, 1984, Pat. No. 4,571,218.

[51] Int. Cl.$^4$ ............................................. F16B 5/00
[52] U.S. Cl. ................................. 403/345; 403/380; 403/4
[58] Field of Search ............... 403/380, 4, 345, 408, 403/388, 261, 303, 311, 314, 310; 411/237, 244, 243

[56] References Cited

U.S. PATENT DOCUMENTS

| | | |
|---|---|---|
| 910,510 | 6/1909 | Davis . |
| 1,011,245 | 12/1911 | Rafter ........................... 403/260 X |
| 2,303,032 | 11/1942 | Dusevoir . |
| 3,318,099 | 5/1967 | Sugden ........................... 403/388 X |
| 3,830,581 | 8/1974 | Furlong ........................... 403/388 X |
| 4,531,926 | 7/1985 | Reeves ........................... 474/49 |
| 4,559,028 | 12/1985 | Reeves, Jr. ........................... 474/152 X |
| 4,571,218 | 2/1986 | Reeves, Jr. ........................... 474/49 |

FOREIGN PATENT DOCUMENTS

| | | | |
|---|---|---|---|
| 561281 | 8/1923 | France | 403/408 |
| 292820 | 7/1925 | France | 403/261 |
| 2379922 | 10/1978 | France | 403/380 |
| 53333 | 5/1942 | Netherlands | 403/388 |

Primary Examiner—Richard J. Scanlan, Jr.
Assistant Examiner—Joseph A. Fischetti

[57] ABSTRACT

A joint between two or more surfaces that is self aligned and secured in all directions is provided with a plurality of interlocking ridges and notches. Preferably, the joint may be adjustable in one direction by disengaging the ridges and notches, moving them laterally with respect to each other and thereafter reengaging them. The ridges and notches are parallel to each other on each side of a dividing line and angularly oriented with respect to the ridges on the other side of the dividing line. Adjustment laterally of the dividing line may be provided by recessing the mating surfaces within the vicinity of the dividing line.

29 Claims, 30 Drawing Figures

ADJUSTABLE HERRINGBONE LOCK JOINT

BACKGROUND OF THE INVENTION

The present application is a continuation-in-part of Ser. No. 512,540, filed in the United States on July 11, 1983, entitled "Reeves Adjustable Pitch Sprocket", now U.S. Pat. No. 4,531,926; Ser. No. 611,111, filed in the United States on May 17, 1984, entitled "Adjustment Pitch Sprocket", now U.S. Pat. No. 4,559,028; and Ser. No. 647,437, filed Sept. 5, 1984, entitled "Adjustable Pitch Sprocket", now U.S. Pat. No. 4,571,218.

SUMMARY OF THE INVENTION

It is an object of the present invention to provide a joint between two or more surfaces that is self aligning and secured in all directions without any motion between the surfaces when the joint is in the fastened position, while allowing where applicable, the surface of one side of the joint to be adjusted in one or more directions in regards to the surface of the opposing side of the joint, when not in the fastened position.

BRIEF DESCRIPTION OF THE DRAWINGS

Further objects, features and advantages of the present invention will become more clear from the following detailed descriptions of the drawings, wherein.

DETAILED DESCRIPTION OF THE INVENTION

The invention provides a locked joint in all directions between two surfaces of two or more objects, when secured, while permitting adjustment to be made between the two surfaces of the objects (where advantageous) when not secured. The invention provides a self aligning locked joint between two surfaces without any shearing action on the bolts or fasteners that secure the joints together.

The invention may be used on joints consisting of various metals, woods, synthetics, or solid compounds.

Like numerals are used throughout to show like parts, with letters added to show useage in different embodiments.

Figure 2:
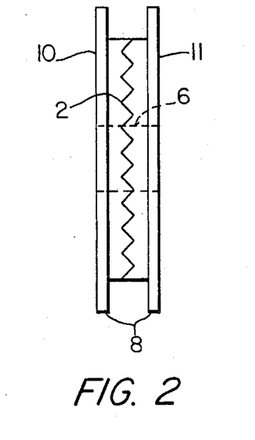
FIG. 2 shows a side view of the assembly of FIG. 1, in the fastened position.

As shown with respect to all of the embodiments, first and second joint members 10, 11 have the mating joint surfaces or mounting surfaces 1, which are preferably symmetrical with respect to the centerline or dividing line 3. On the mating joint surfaces, there are formed a plurality of ridges 12 and grooves 13, which ridges and grooves on one side of the dividing line 3 alternate and are parallel to each other, and on the other side of the dividing line 3, they alternate and are parallel to each other. The ridges and grooves form the design 2. As seen in FIG. 2, when the members 10, 11 are placed together, the mating surfaces contact each other so that the ridges and notches of the member 10 interengage respectively with the notches and ridges of the member 11. Thus, FIG. 2 shows a first assembly position.

Figure 3:
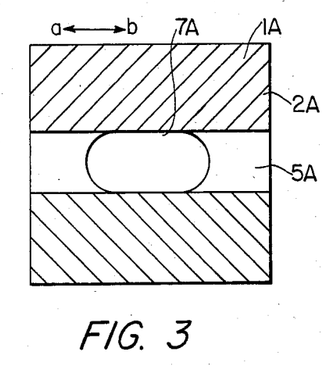
FIG. 3 shows a top cross-sectional view of one side of a square herringbone lock joint that is adjustable in the horizontal direction.
Figure 4:
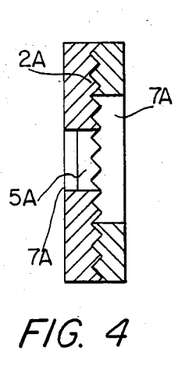
FIG. 4 shows a side cross-sectional view of the assembly of FIG. 3 and FIG. 5 sides that is adjustable horizontally and vertically.
Figure 5:
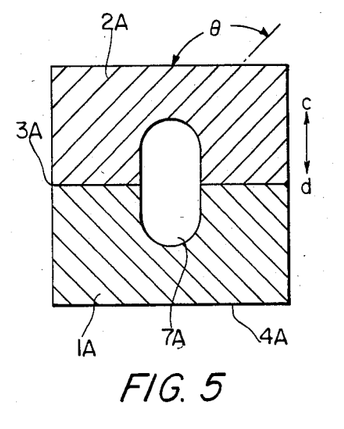
FIG. 5 shows a side view of one side of the square herringbone lock joint that is adjustable in the vertical direction.

Although not shown, if the members 10 and 11 were moved horizontally away from each other, as seen in FIG. 2, and then moved vertically relative to each other for a multiple of the ridge spacing, and thereafter moved back into engagement, it can be seen that the relative position between the members 10 and 11 would be adjusted wherein a second assembly position is provided. An elongated slot, such as 7a FIG. 3, is required in at least one of the members 10, 11 to provide fastening in the new position. Other types of fastening means that were provided for lost motion could also be used to accommodate such adjustment.

With a combination of the relief or recess 5a, for example as shown in FIG. 3, and universal lost motion provided by the fastener means, more specifically by the bolt slots in the two members being at right angles to each other, the two members may be universally adjusted in stepwise fashion. More particularly, the plurality of assembly positions that are obtainable as mentioned above can be duplicated in corresponding sets laterally. That is, the first set of assembly positions would be obtained by stepwise relative movement of the two members in a direction parallel to the dividing line 3, and the second set of assembly positions would be obtained by moving the two members relative to each other perpendicular to the dividing line 3. The recess is preferably provided on each side of the dividing line for a distance along the dividing line coextensive with the ridges and notches and to adapt at least as great as the depth of the notches. With such an arrangement, the fastener, preferably a bolt (not shown) may be loosened or removed so that the members may be disengaged from each of the assembly positions of the first set and relatively shifted perpendicular to the dividing line so as to engage each ridge in a notch adjacent to its previously engaged notch and so that the ridges on one side of their dividing line for each member will extend into the recess area of the other member on the other side of the dividing line, whereby the members may be adjusted in any direction, within a range, along the remaining surfaces.

Figure 21:
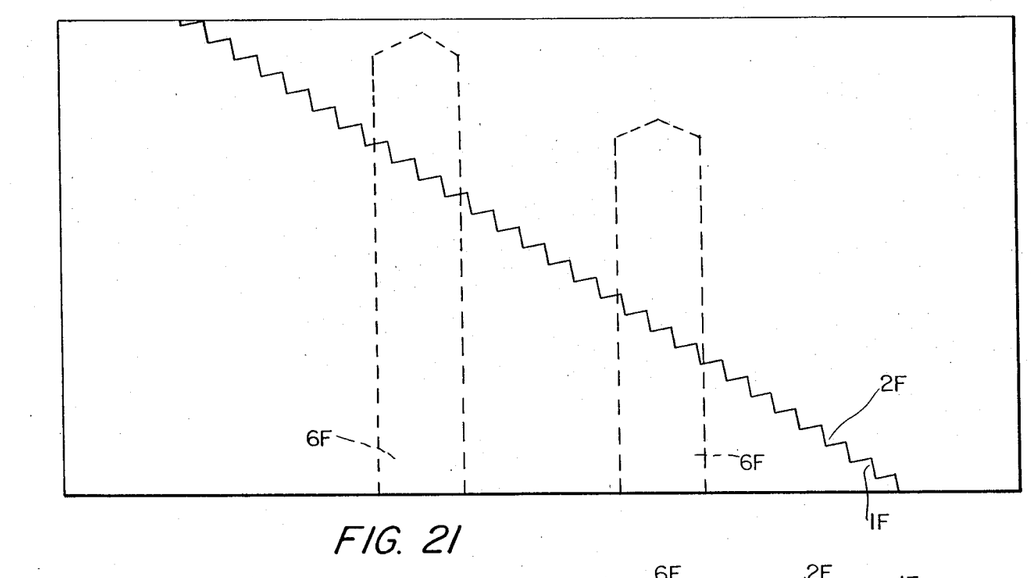
FIG. 21 shows a side view of two rectangle bars joined end to end using the integrated herringbone lock joints, to be secured in place with two bolts.
Figure 22:
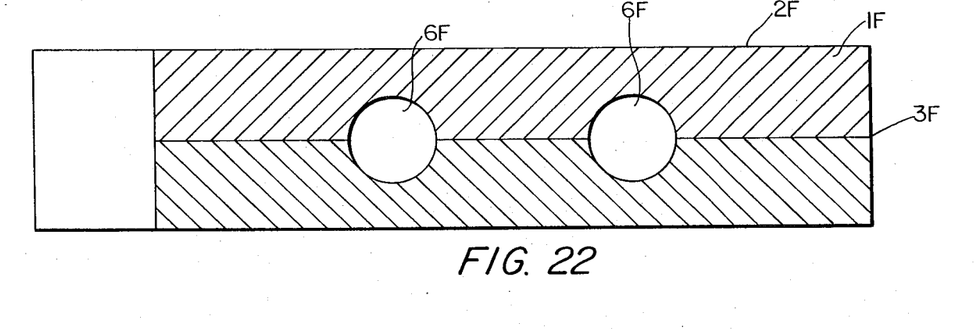
FIG. 22 shows a top view of the left bar used in FIG. 21.

There is no adjustment with respect to the embodiments of FIGS. 1 and 2, 6 and 7, 21 and 22, 8 and 9, 10–16, 25–27 and 28–30. Universal adjustment, in stepwise increments, within ranges is provided along the mating surfaces with respect to the embodiments of FIGS. 3–5, and 23, 24. Adjustment only parallel to the dividing line is provided in the embodiment of FIGS. 17–20. However, adjustment parallel to the dividing line or universally may be provided for the other embodiments and is contemplated. For example, the rod joint of FIGS. 21, 22 could be provided with reliefs and cross-slots according to the structure of FIGS. 23, 24, as could the shaft joint of FIGS. 10–16 and the triple or four member embodiment of FIGS. 17–20.

Figure 25:
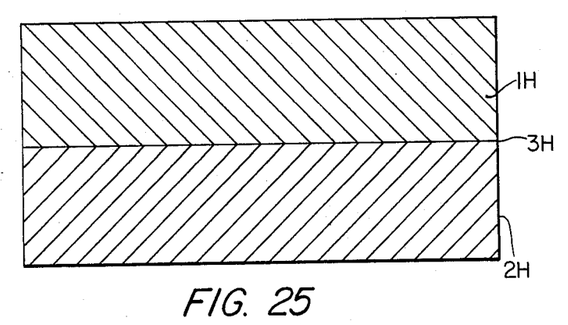
FIG. 25 shows a top or bottom view of a herringbone lock joint without any holes.
Figure 26:
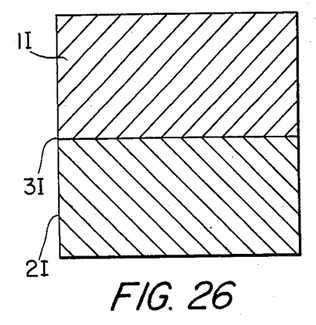
FIG. 26 shows an end view of a herringbone lock joint without any holes.
Figure 27:
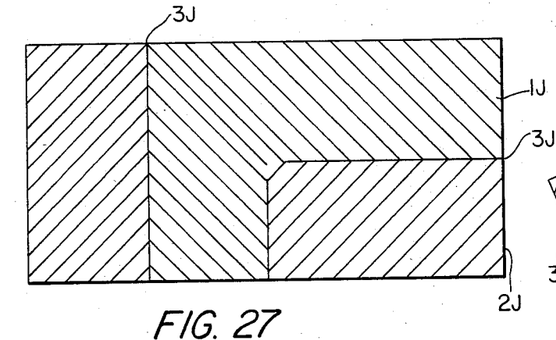
FIG. 27 shows a top and bottom view of a herringbone lock joint without holes.

With the brick work of FIGS. 25–27, normally no adjustment would be needed. FIG. 26 shows a half and FIG. 27 shows a corner brick wherein two bricks according to FIG. 25 could be mounted perpendicular to each other on the brick of FIG. 27, with a half overlap in a conventional manner of bricklaying, but without mortar. If desired, mortar could be used either of a conventional thickness or of a very thin bonding layer. Furthermore, the brick work of FIGS. 25–27 could be provided with a recessed area along the dividing line, so that a selected bricks could be laterally shifted one or more notches to provide a decorative affect for the brick wall. Adjustment is not contemplated for the embodiments of FIGS. 8, 9 and 28–30.

While all of the mating surfaces have been shown as planar, it is to be understood that they may be arcuate and provided with adjustment along the dividing line, or there may be spherical and provided with universal adjustment.

Figure 28:
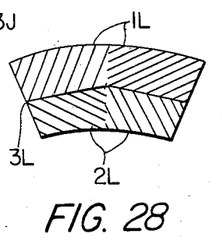
FIG. 28 shows a top view of the herringbone lock joint used on a section of a circle.
Figure 29:
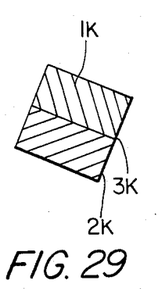
FIG. 29 shows a view of either end of FIG. 28.
Figure 30:
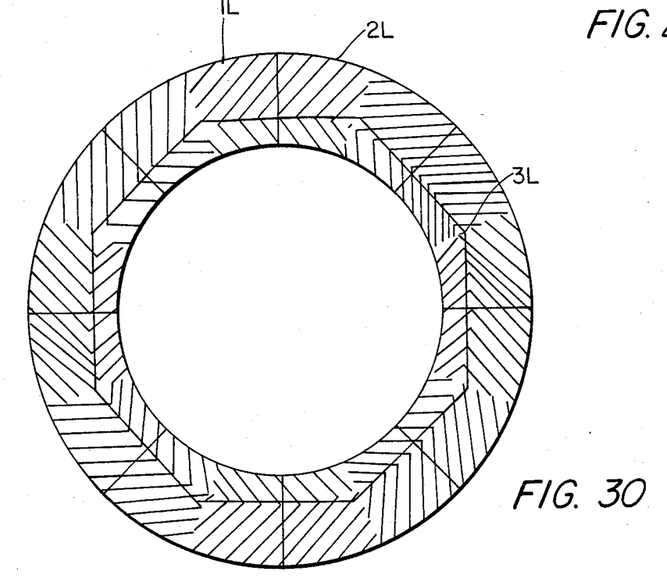
FIG. 30 shows a top view of a cylindrical structure using eight sections of FIGS. 28 and 29. The bottom view of FIG. 28 would be the same as a top view of a section of FIG. 30 taken from center to center of two sections.

Further, it is seen that the dividing line itself may be a straight line, on either a planar or curved surface, or it could be an arcuate line as a modification of the embodiment of FIGS. 28–30.

The mounting surfaces 1 shown in FIGS. 1–12, 15, and 17–30 are of the herringbone notched and ridged design 2. A plurality of notches and ridges extend from the centerline at 3 of the joint (at an angle of more than 90 degrees and less than 180 degrees to the center line 3) to the outer edges 4, left and right. The herringbone notches and ridges cover the mounting surfaces 1 except where relieved at 5 to permit vertical adjustment. The herringbone notches and ridges are of equal and opposite angles to the center line 3 extending through holes 6 and 7. Each herringbone notch and ridge design 2 is of equal space and design as to the adjacent notch and ridge. The area of the mounting surfaces 1 of each lock joint assembly are not always dimensionally equal. For each joint assembly, both design and dimensions are equal for each herringbone notch and ridge design 2 and they form oblique angles to the centerline 3. The protruding edges of each herringbone ridge fits precisely into the indented opposing herringbone notch for surfaces 1, thereby creating a locked joint in all directions when secured against movement prependicular to surfaces 1 in the adjusted location. With the joint with the round bolt holes 6 in the one side and the slotted holes 7 in the matching side it is possible to adjust the joint horizontally one or more notches at a time in either direction a or b. When all holes are round and to size for the bolts or fasteners being used no adjustment is possible. Joints with slotted holes 7 in the horizontal direction of one side and vertical direction in the opposite side and one or both sides of the joint is relieved in the center area 5 below the depth of the notches, the joint can be adjusted both in the horizontal direction a and b and the vertical direction c and d one or more notches at a time.

The contour of the mounting surface 1 of the joint may be flat, concave or convex, so long as it corresponds to the opposing mounting surface and permits the joint to be adjusted without losing equal contact between mounting surfaces 1 when in the secured position.

The shape of the individual notch and ridge may be of the tapered sided v, radially corrogated or any other shape so long as they are of equal shape, spacing and dimensions, and form a herringbone surface on all objects that make up the herringbone lock joint.

To adjust the adjustable herringbone lock joint, remove all bolts or fasteners, clean the mounting surfaces, adjust one or more notches in the directions provided and secure bolts or fasteners.

The herringbone lock joint may be an integral part of the objects they secure as shown in FIGS. 8–12, 15, 21, 22 and 25–30, or they may be secured to the objects in the following manners.

Figure 1:
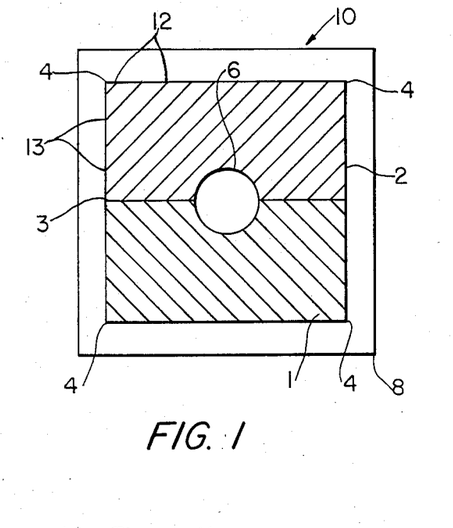
FIG. 1 shows a top view of one side of a square nonadjustable herringbone lock joint used in the present invention.

As shown in FIGS. 1 and 2 an extended edge 8 may be provided to weld, bolt or clamp the joints to the objects.

The object may have holes that the joint is plug welded through.

The object and joint may be secured to each other with various epoxies, cements or glues, depending upon the material each is composed of.

The methods listed to secure the joints to the objects are not intended to be all the methods but only suggestions.

Any difference in various drawings, if applicable to other drawings shown are intended to be included in the invention.

Figure 23:
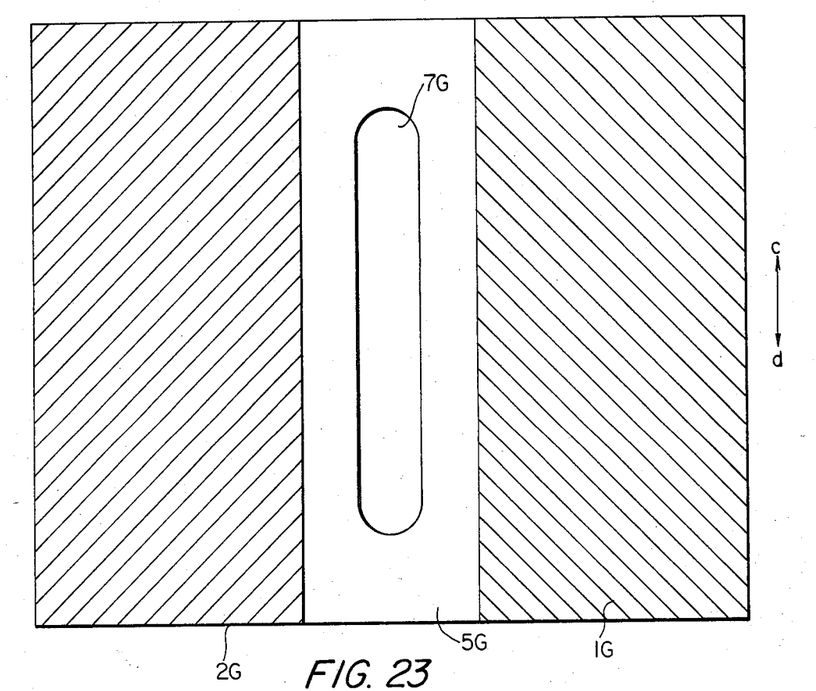
FIG. 23 shows one side of another joint.
Figure 24:
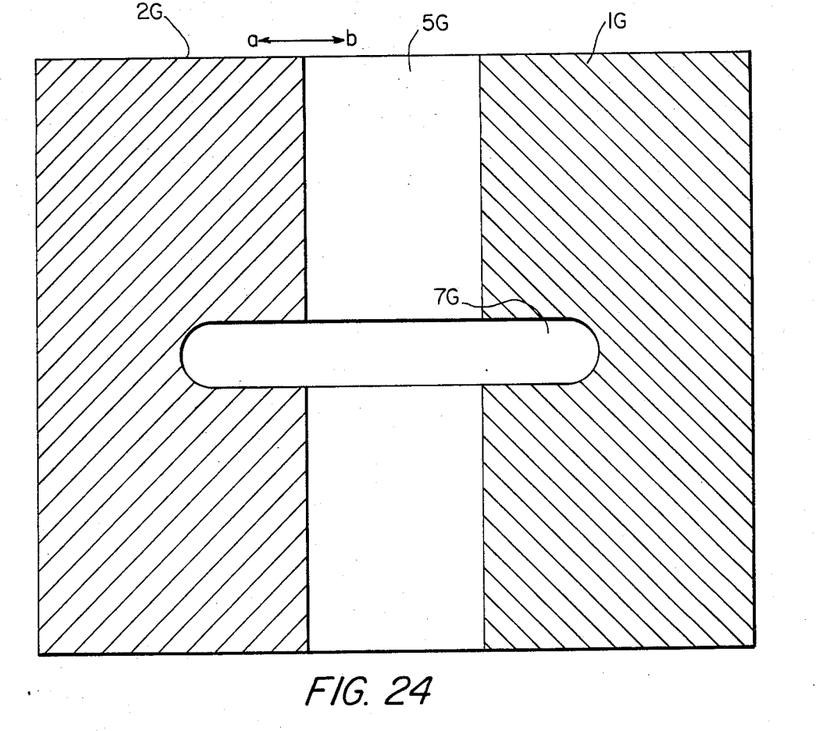
FIG. 24 shows a face view of an adjustable herringbone lock joint side that permits adjustment both horizontally and vertically over a large range when used with the Figure side of 23, which completes the joint.

To help clarify the invention, an example of FIGS. 23 and 24 listing the possible dimensions will be shown. This is not intended to limit the scope of the size or dimensions of any other joint.

Example: An adjustable herringbone lock joint as shown in FIGS. 23 and 24 could have the following:
Height of 5 inches.
Width of 6 inches.
Vertical slot ½ inch×3½ inches.
Horizontal slot ½ inch×3½ inches.
Center relieved area 1½ inches×5 inches.
Depth of relief 0.170 inches.

V notch and ridge are a 60 degree equilateral triangle with a depth of 0.150 inches, width from ridge to ridge 0.1767 inches.

V notch and ridge are at a 135 degrees angle to the vertical center line.

An adjustable herringbone lock joint with example dimensions, using a ½ inch diameter bolt to secure the two sides of the joint to each other would provide a joint that could be adjusted in increments of ¼ inch vertical or horizontal with 12 adjustments in each direction, providing 144 different positions, that the joint could be adjusted.

By changing the width from ridge to ridge and the angle of the notch and ridge to the center line, you can change the dimensions of the increments of adjustment. You could have ¼ inch increments vertical and 3/16 inch increments horizontal. This would be determined at the time of the manufacture of the various joints.

The following are examples of applications of the joints shown in the different Figures.

This is not intended to limit the applications to these examples but to better clarify the invention.

Figure 6:
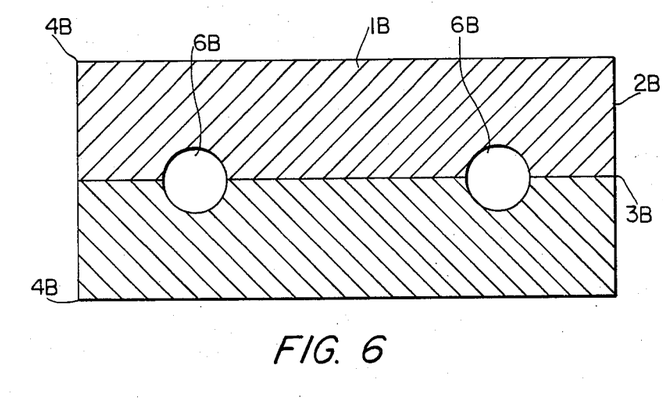
FIG. 6 shows a side view of one side of a rectangular nonadjustable herringbone lock joint that is fastened with two bolts.
Figure 7:
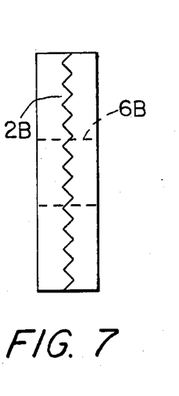
FIG. 7 shows an end view of an assembled joint using two sides, as shown in FIG. 6.

The herringbone lock joint FIGS. 1 and 2 may be used to secure joints in structural steel, making a joint of greater strength with no shearing action on the fastener (bolt, rivet, etc.). Examples of usage: steel bridges, structural steel buildings, scaffolding, crane booms, fan blades, carpenter squares, to extend handles such as large wrenches, to mount towers or light poles, to secure equipment in place, such as on a ship, to fasten mixer paddles or tips in place, and to fasten tooth points to adapters, tooth adapters to equipment blades or bucket edges. Where the aforementioned applications require more than one fastener hole, FIGS. 6 and 7 may be used or a combination of FIGS. 1 and 6, if any adjustment is required for any of the afore-mentioned applications, joints or combinations of joints FIGS. 1, 3, 5, 6, 17, 23 and 24 may be instigated. FIGS. 6 and 7 may be used to integrate lock joints between track shoes and track links on bulldozers, front end loaders, power shovels or backhoes; to secure buckets or flight bars to chain links such as bucket elevators or flight feeders; to secure in place pillow blocks; to fasten the two sections of a universal joint; secure track rollers to track frames and track roller stands in place; to secure flanged end pins or shafts. Combinations of other Figures shown may be used where applicable.

FIGS. 17, 18, 19 and 20 may be used to make a self aligning, adjustable lock joint for the following applications with no shearing action on the bolts. Motor mounts where the motor is used with belt or chain driving equipment, permits belt or chain tension to be adjusted; offset crank drives, provides join between the drive shaft to be adjusted for increasing or decreasing the amount of stroke; a belt or chain idler to take up slack where drive is in a fixed position. Combinations of other Figures shown may be used where applicable.

FIGS. 10, 11, 12, 21 and 22 may be used to integrate a herringbone lock joint in a chain or track link; to fasten two bars of the same size together end to end, without increasing the size of the bars at the joint in height, width or diameter.

Figure 10:
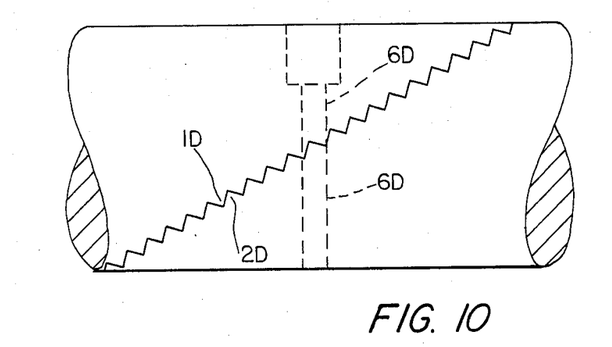
FIG. 10 shows a side view of two round shafts coupled together using the herringbone lock joint.
Figure 11:
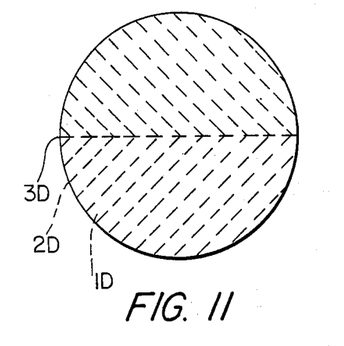
FIG. 11 shows an end view of the round shaft of FIG. 10.
Figure 12:
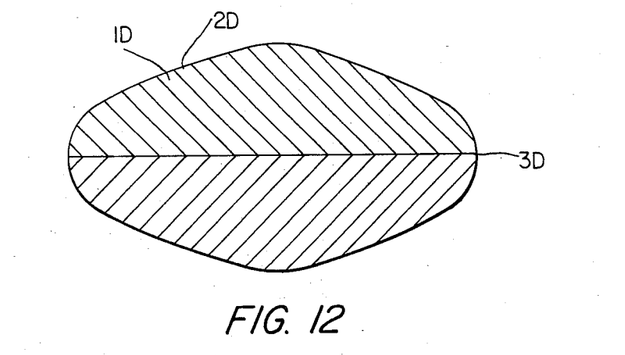
FIG. 12 shows a top view of the round shaft of FIG. 10 with the integrated herringbone lock joint.
Figure 13:
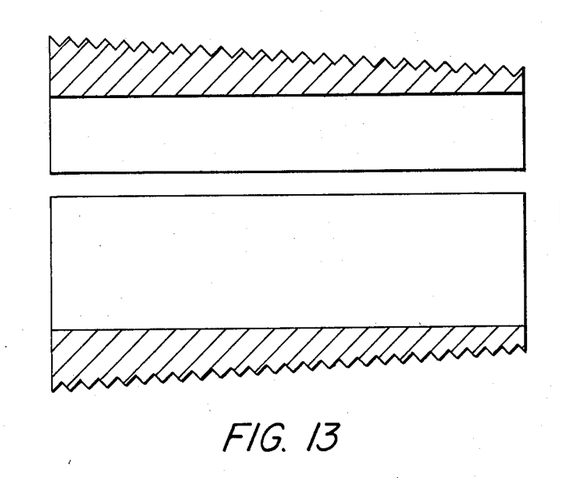
FIG. 13 shows a cross-sectional side view taken on line 13—13 of FIG. 14 of a split tapered threaded sleeve that may be used to fasten the two round shaft ends of FIG. 20 together instead of or in addition to the bolt in FIG. 10.
Figure 14:
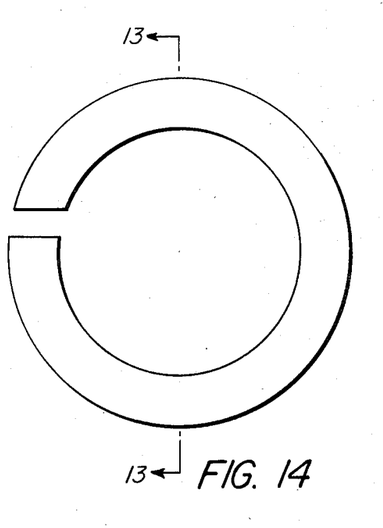
FIG. 14 shows an end view of the sleeve of FIG. 13.
Figure 15:
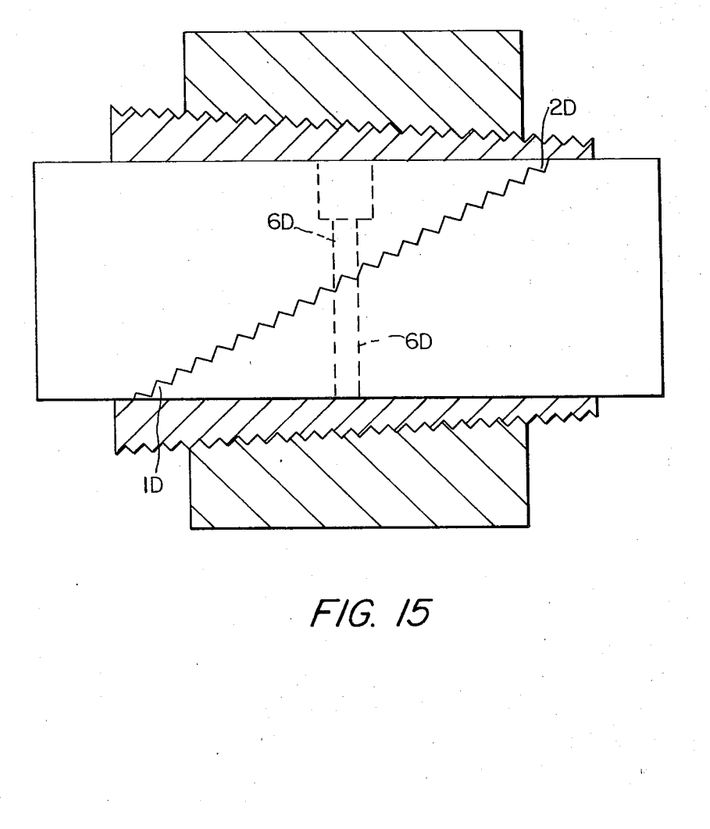
FIG. 15 shows a cross section of the assembly of the two shafts of FIG. 10, end to end using the integrated herringbone lock joint secured in place with the sleeve shown in FIG. 13 and 14 and a hexagon tapered threaded nut screw on the sleeve.
Figure 16:
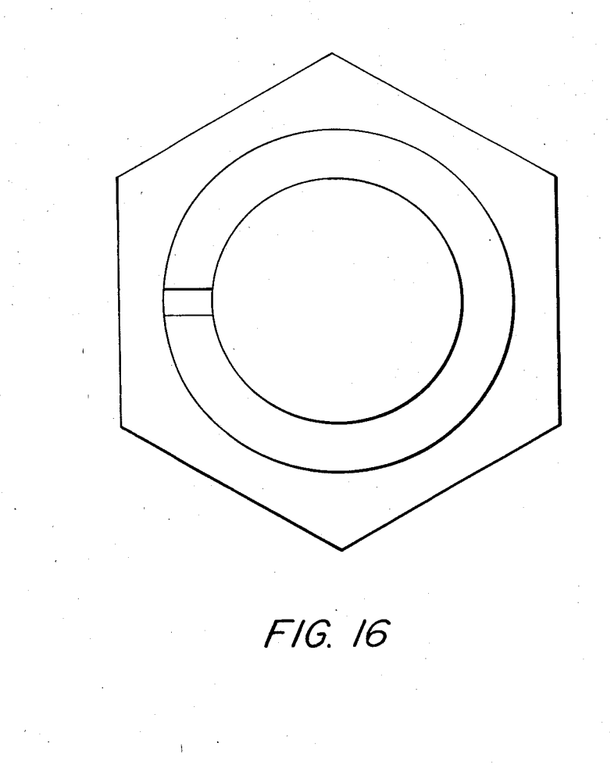
FIG. 16 shows an end view of FIG. 15.
Figure 17:
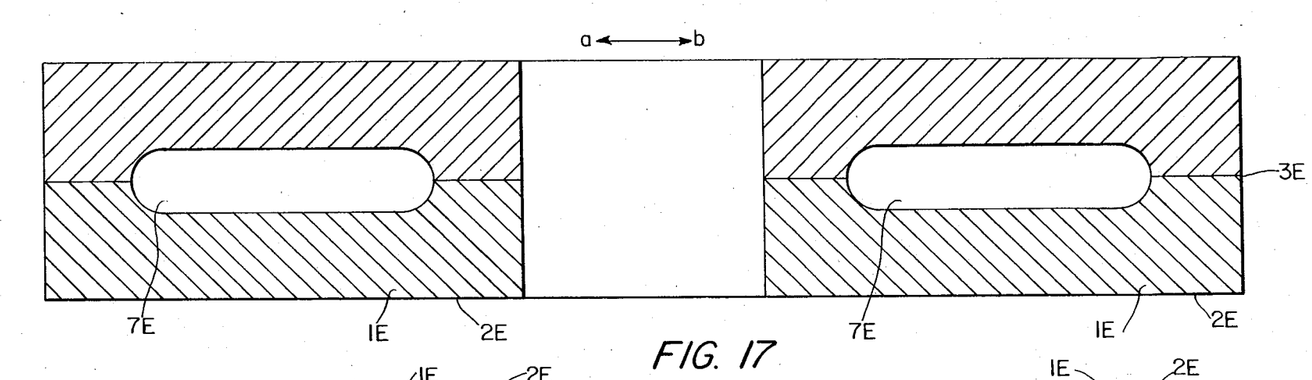
FIG. 17 shows a view of one side of a rectangle adjustable herringbone lock joint having two slotted holes in the horizontal direction.
Figure 18:
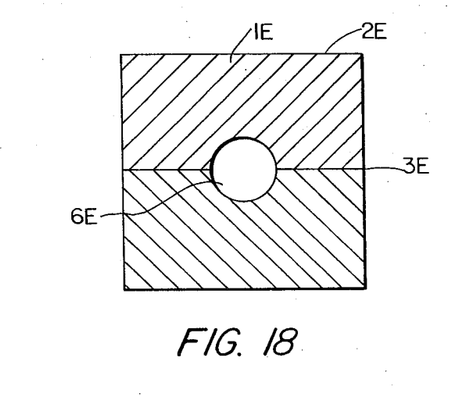
FIGS. 18 and 19 show views of the opposing sides of herringbone lock joints that may be used in FIG. 17.
Figure 19:
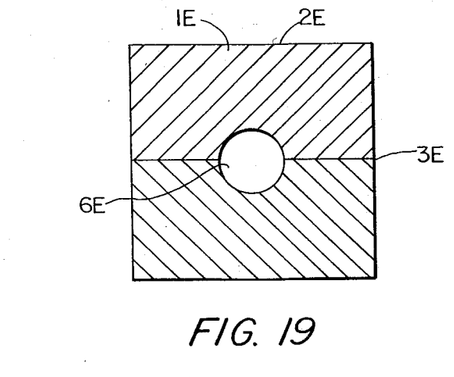
Figure 20:
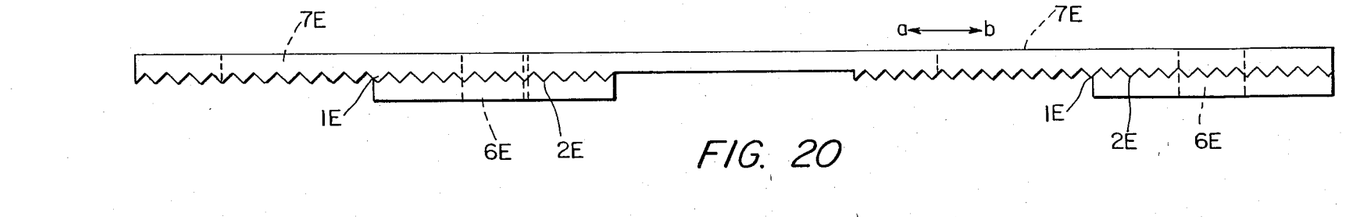
FIG. 20 shows an edge view of FIGS. 17, 18 and 19 in one of the assembled positions.

To secure the joint of FIGS. 10-12, a bolt (not shown) is passed through the holes 6D and cemented into one of the members as clearly seen with respect to the drawing. Since the bolt does not take any shearing force, as in the other embodiments, the fastener is free of shearing stresses. The sleeve shown in FIGS. 13 and 14 may be provided in addition to the bolt or instead of the bolt. The sleeve is merely telescoped over the joint. The sleeve as shown has a tapered threaded exterior surface and a smooth cylinderical interior surface that is the diameter of the shafts. The nut shown in FIGS. 15 and 16 has an interior threaded tapered surface that threads onto the exterior of the split sleeve, so that the split sleeve and nut surround the shaft and enclose therein the remaining surfaces. In a similar manner, threaded bolts are used to secure the members together in FIGS. 21 and 22, with it being understood that it is not necessary to recess the head of the bolt, because no split sleeve is being used and no rotation is contemplated for the elongated members. As a modification, the interior surface of the nut and exterior surface of the sleeve could be conical and force fit together by pressure and/or heat shrinking.

Figure 8:
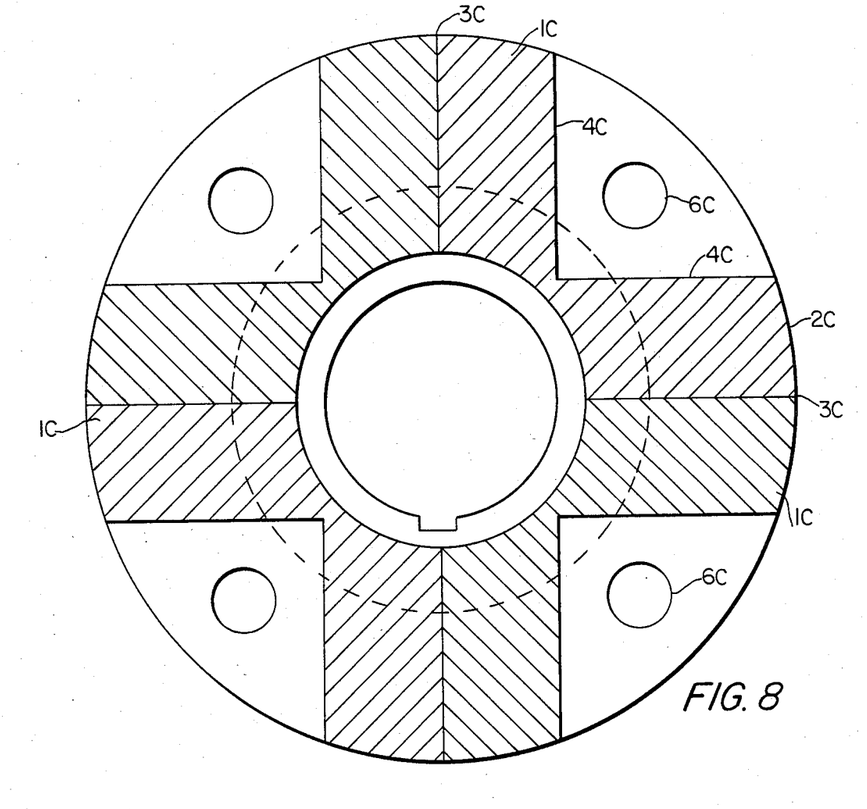
FIG. 8 shows the flange surface of a flange coupling that has four herringbone lock joints with opposing patterns.
Figure 9:
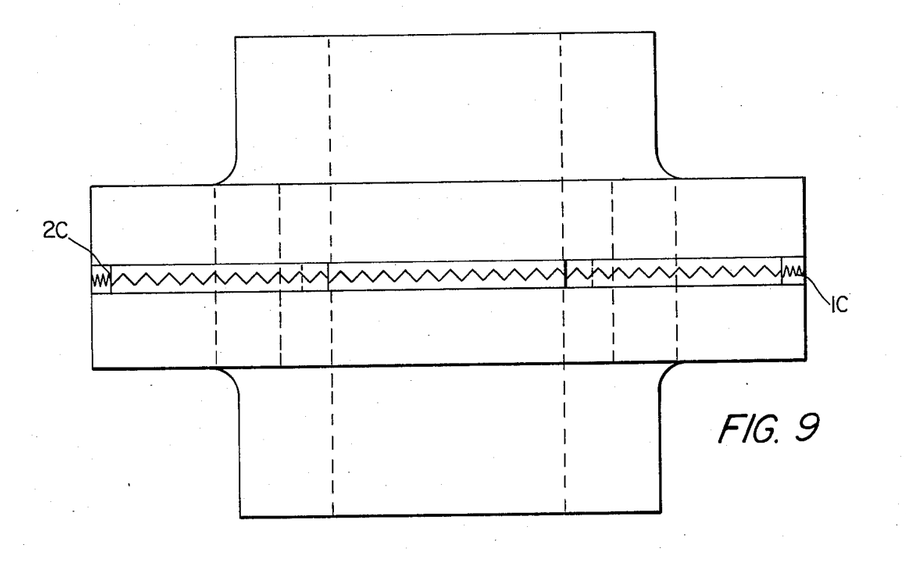
FIG. 9 shows the side view of a flange coupling assembly using two flanges shown in FIG. 8.

Shafts may also be coupled together as shown with respect to the members in FIGS. 8 and 9. The members comprise flanges that are provided with hubs having the illustrated key way for securing them respectively to shafts (not shown). The mating surfaces of the flanges total four in number and are arranged in opposed pairs angularly oriented about the axis of the shafts or axis of the mounting for the shafts. As seen, four holes are provided between the mating surfaces so that bolts may be passed through the engaged flanges to axially bolt the coupling together. This is particularly advantageous with respect to a flange mounting for rotating shafts, because the bolts will not take any shearing forces due to the nature of the coupling.

FIG. 26 may be used in quantity to integrate a self aligning, self centering herringbone lock joint as shown in FIGS. 8 and 9.

FIGS. 25, 26 and 27 show a self aligning lock joint integrated into the top, bottom and ends of bricks or building blocks. The block of FIG. 27 would be used to go around a corner.

FIGS. 28, 29 and 30 show a self aligning lock joint integrated into the top, bottom and ends of curved bricks or building blocks to construct silos, smoke or exhaust stacks or any other cylindrical structure.

I claim:
1. A mechanical joint, comprising:
first and second joint members having mating joint surfaces with a dividing line;
a first set of a plurality of alternating and parallel ridges and notches on one side of said dividing line for each of said members, so that said members may be placed together with the mating surfaces contacting each other and the ridges and notches of one member interengaging with the notches and ridges of the other member, respectively, in a first assembly position, moved away from each other to disengage the ridges and notches so that the surfaces may be shifted laterally of the extent of the ridges and notches to a new position wherein they may be re-engaged at a second assembly position offset from the first assembly position, and in a like manner adjusted to a plurality of additional assembly positions that are different from each other;

a second set of a plurality of alternating and parallel ridges and notches on each of said members on the other side of said dividing line so arranged that the ridges and notches of the second set will interengage with each other respectively for the two members in each of said assembly positions;

said first set and second set of ridges and notches each being arranged at an acute angle with respect to said dividing line and at an angle to each other to thereby prevent relative movement between said members along their mating surfaces in any direction when in any one of said assembly positions; and fastener means for holding said members in their assembled positions, and said fastener means being selectively releasable to permit movement of said mating surfaces of said members perpendicular to said mating away from each other so that they may be shifted and reassembled in another of said assembly positions to thereby provide a secure and adjustable joint between said members.

2. The joint of claim 1, wherein said mating surfaces are planar.

3. The joint according to claim 2, wherein said mating surface for at least one of said members is completely recessed on each side of said dividing line for a distance along said dividing line coextensive with said ridges and notches, and recessed to a depth at least as great as the depth of said notches;

said fastener means permitting relative adjustment between said members parallel and perpendicular to said dividiing line, so that at least an additional set of said assembly positions is formed by disengaging said members from each assembly position of the first mentioned set of assembly positions and relatively shifting said members perpendicular to said dividing line so as to engage each ridge in a notch adjacent to its previously engaged notch and so that the ridges on one side of their dividing line for each member will extend into the recessed area of the other member on the other side of its dividing line, whereby the members may be adjusted in any direction, within a range, along their mating surfaces.

4. The joint according to claim 3, wherein said fastener means includes elongated slots in and through each of said members that are perpendicular to each other when in any assembly position, with one slot generally bisecting its dividing line and the other slot being generally parallel to its dividing line.

5. A joint according to claim 1, wherein said fastener means includes alignable apertures respectively in said members and extending through said mating surfaces for receiving a threaded bolt.

6. A mechanical joint, comprising:

first and second joint members having mating joint surfaces with a dividing line;

a first set of plurality of alternating and parallel ridges and notches on one side of said dividing line for each of said members, so that said members may be placed together with the mating surfaces contacting each other and the ridges and notches of one member interengaging with the notches and ridges of the other member, respectively, in an assembly position, and moved away from each other to disengage the ridges and notches;

a second set of a plurality of alternating and parallel ridges and notches on each of said members on the other side of said dividing line so arranged that the ridges and notches of the second set will interengage with each other respectively for the two members in said assembly position;

said first set and second set of ridges and notches each being arranged at an acute angle with respect to said dividing line and at an angle to each other to thereby prevent relative movement between said members along their mating surfaces in any direction when in said assembly position; and fastener means for holding said members in their assembled position, and said fastener means being selectively releasable to permit movement of said mating surfaces of said members away from each other so that they may be disassembled and reassembled in another assembly position to thereby provide a secure and adjustable joint between said members.

7. The joint of claim 6, wherein said dividing line extends along said mating surface in an arc.

8. The joint according to claim 6, wherein each of said members includes a second mating surface coextensive with and adjacent the first mating surface and having thereon a second dividing line and ridges and notches on each side of said second dividing line in a pattern generally the same as the pattern of said first ridges and notches, with said dividing lines for each member being perpendicular to each other.

9. The joint according to claim 6, wherein each of said members includes a second mating surface coextensive with and adjacent the first mentioned mating surface and having thereon a second dividing line and ridges and notches on each side of said second dividing line in a pattern generally the same as the pattern of said first mentioned ridges and notches, with said dividing lines for each member being angularly oriented with respect to each other.

10. The joint according to claim 6, wherein each of said members is elongated and wherein said mating surfaces are planar and formed at an acute angle with respect to the elongation of their respective members.

11. The joint according to claim 10, wherein said members are each shafts.

12. The joint according to claim 10, wherein each of said members is a rectangular rod.

13. The joint according to claim 10, wherein said fastener means includes alignable apertures respectively in said members and extending through said mating surfaces for receiving threaded bolts.

14. The joint according to claim 10, wherein said fastener means includes a split sleeve for surrounding said elongated members and enclosing therein said mating surfaces, and having a tapered threaded surface on its exterior; and said fastener means further including a nut having a threaded interior tapered surface mating with the exterior tapered surface of said sleeve.

15. A joint according to claim 6, wherein each of said members is a flange having means for securing it respectively to a shaft, and wherein there are a plurality of said mating surfaces angularly arranged around said flange.

16. A joint according to claim 15, wherein for each flange, its mating surfaces are arranged in pairs on opposite sides of the centerline of the means for joining the flange to a shaft.

17. The joint of claim 6, wherein said mating surfaces are planar.

18. The joint according to claim 6, wherein said mating surface for at least one of said members is completely recessed on each side of said dividing line for a distance along said dividing line coextensive with said ridges and notches, and recessed to a depth at least as great as the depth of said notches;

said fastener means permitting relative adjustment between said members parallel and perpendicular to said dividing line, whereby the members may be adjusted in a plurality of directions, within a range, along their mating surfaces.

19. The joint according to claim 18, wherein said fastener means includes elongated slots in and through each of said members that are perpendicular to each other when in any assembly position, with one slot generally bisecting its dividing line and the other slot being generally parallel to its dividing line.

20. A joint according to claim 6, wherein the fastener means includes alignable apertures respectively in said members and extending through said mating surfaces for receiving a threaded bolt.

21. A mechanical joint, comprising:
first and second joint members having mating joint surfaces,
a first set of a plurality of alternating and parallel ridges and notches on one portion of said joint surfaces for each of said members, so that said members may be placed together with the mating surfaces contacting each other and the ridges and notches of one member interengaging with the notches and ridges of the other member, respectively, in a first assembly position, moved away from each other to disengagge the ridges and notches so that the surfaces may be shifted laterally of the extent of the ridges and notches to a new position wherein they may be re-engaged at a second assembly position offset from the first assembly position, and in a like manner adjusted to a plurality of additional assembly positions that are different from each other;
a second set of a plurality of alternating and parallel ridges and notches on each of said members on a second portion of said joint surfaces so arranged that the ridges and notches of the second set will interengage with each other respectively for the two members in each of said assembly positions;
said first set and second set of ridges and notches being arranged at an acute angle with respect to a common boundary and at an angle to each other to thereby prevent relative movement between said members along their mating surfaces in any direction when in any one of said assembly positions; and
fastener means for holding said members in their assembled positions, and said fastener means being selectively releasable to permit movement of said members perpendicular to said mating surfaces away from each other so that they may be shifted and reassembled in another of said assembly positions to thereby provide a secure and adjustable joint between said members.

22. The joint of claim 21, wherein said mating surfaces are planar.

23. The joint according to claim 21, wherein said mating surface for at least one of said members is completely recessed on each side of said common boundary for a distance along said joint surfaces coextensive with said ridges and notches, and recessed to a depth at least as great as the depth of said notches;

said fastener means permitting relative adjustment between said members parallel and perpendicular to said common boundary, so that at least an additional set of said assembly positions is formed by disengaging said members from each assembly position of the first mentioned set of assembly positions and relatively shifting said members perpendicular to said common boundary so as to engage each ridge in a notch adjacent to its previously engaged notch and so that the ridges of one side of said common boundary for each member will extend into the recessed area of the other member on the other side of said common boundary whereby the members may be adjustd in any direction, within a range, along their mating surfaces.

24. The joint according to claim 21, wherein said fastener means includes elongated slots in and through each of said members that are perpendicular to each other when in any assembly position, with one slot generally bisecting said common boundary and the other slot being generally parallel to said common boundary.

25. A joint according to claim 23, wherein said fastener means includes aligned apertures respectively in said members and extending through said mating surfaces for receiving a threaded bolt.

26. A mechanical joint, comprising:
first and second joint members having mating joint surfaces,
a first set of a plurality of alternating and parallel ridges and notches on one side of a boundary for each of said members, so that said members may be placed together with the mating surfaces contacting each other and the ridges and notches of one member interengaging with the notches and ridges of the other member, respectively, in an assembly position, moved away from each other to disengage the ridges and notches;
a second set of a plurality of alternating and parallel ridges and notches on each of said members on the other side of said boundary so arranged that the ridges and notches of the second set will interengage with each other respectively for the two members in said assembly position;
said first set and second set of ridges and notches each being arranged at an acute angle with respect to said boundary and at an angle to each other to thereby prevent relative movement between said members along their mating surfaces in any direction when in said assembly position; and
fastener means for holding said members in their assembled position, and said fastener means being selectively releasable to permit movement of said members perpendicular to said mating surfaces away from each other so that they may be disassembled and to thereby provide a secure and adjustable joint between said members.

27. The joint according to claim 26, wherein said fastener means includes elongated slots in and through each of said members that are perpendicular to each other when in any assembly position, with one slot generally bisecting said boundary and the other slot being generally parallel to said boundary.

28. The joint according to claim 26, wherein said mating surface for at least one of said members is completely recessed on each side of said boundary for a distance along said joint surfaces coextensive with said ridges and notches, and recessed to a depth at least as great as the depth of said notches;

said fastener means permitting relative adjustment between said members parallel and perpendicular to said boundary, so that at least an additional set of said assembly positions is formed by disengaging said members from each assembly position of the first mentioned set of assembly positions and relatively shifting said members perpendicular to said boundary so as to engage each ridge in a notch adjacent to its previously engaged notch and so that the ridges on one side of said boundary for each member will extend into the recessed area of the other member on the other side of said boundary whereby the members may be adjusted in any direction, within a range, along their mating surfaces.

29. The joint according to claim 28, wherein said fastener means includes elongated slots in and through each of said members that are perpendicular to each other when in any assembly position, with one slot generally bisecting said boundary and the other slot being generally parallel to said boundary.

* * * * *